United States Patent
Koseoglu et al.

(10) Patent No.: US 10,793,782 B2
(45) Date of Patent: Oct. 6, 2020

(54) SOLVENT FOR USE IN AROMATIC EXTRACTION PROCESS

(71) Applicant: Saudi Arabian Oil Company, Dhahran (SA)

(72) Inventors: Omer Refa Koseoglu, Dhahran (SA); Robert Peter Hodgkins, Dhahran (SA); Adnan Ahmad Al-Hajji, Dammam (SA); Hendrik Muller, Dhahran (SA); Nadrah Abdullah Alawani, Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/210,317

(22) Filed: Dec. 5, 2018

(65) Prior Publication Data

US 2020/0181506 A1    Jun. 11, 2020

(51) Int. Cl.
*C10G 21/22*    (2006.01)
*B01D 11/04*    (2006.01)

(52) U.S. Cl.
CPC .......... *C10G 21/22* (2013.01); *B01D 11/0492* (2013.01); *B01D 2257/7027* (2013.01); *C10G 2300/1096* (2013.01); *C10G 2400/08* (2013.01); *C10G 2400/10* (2013.01)

(58) Field of Classification Search
None
See application file for complete search history.

(56) References Cited

U.S. PATENT DOCUMENTS

| | | | | |
|---|---|---|---|---|
| 2,615,057 | A | | 10/1952 | Wolff et al. |
| 2,658,038 | A | * | 11/1953 | Proell .................. C07C 317/00 134/42 |
| 2,849,514 | A | * | 8/1958 | Nevitt .................. C10G 21/22 585/856 |
| 3,356,755 | A | * | 12/1967 | Beckham ............... C07C 17/38 570/263 |
| 4,544,796 | A | | 10/1985 | Kurek et al. |

OTHER PUBLICATIONS

Savige et al., "Oxidation of Disulfides, With Special Reference to Cystine", Organic Sulfur Compounds, 1996, vol. 2, pp. 368-370.
International Search Report and Written Opinion dated Feb. 18, 2020 in counterpart International Application PCT/US2019/063811 filed Nov. 28, 2019.

* cited by examiner

*Primary Examiner* — Tam M Nguyen
(74) *Attorney, Agent, or Firm* — Abelman, Frayne & Schwab

(57) ABSTRACT

Oxidized disulfide oil (ODSO) compounds, derived from by-product disulfide oil (DSO) compounds produced as by-products from the generalized mercaptan oxidation (MEROX) in the practice of the process, are effective as aromatic extraction solvents. This use of ODSO compounds as an extraction solvent converts an otherwise DSO waste oil product into a valuable commodity that has utility in improving the extraction of aromatics from hydrocarbons derived from fossil fuels.

8 Claims, 2 Drawing Sheets

SOLVENT FOR USE IN AROMATIC EXTRACTION PROCESS

BACKGROUND OF THE INVENTION

Field of the Invention

The invention relates to solvents for use in the extraction of aromatic compounds from a mixture of hydrocarbons.

Description of Related Art

Extraction of aromatic compounds, or "aromatics", is a well-known process in the refining and petrochemical industries. Aromatics can be extracted from various aromatic-containing streams, e.g., catalytic reformate and pyrolysis gasoline using several different methods, including liquid-liquid extraction and extractive distillation. Commonly used solvents for aromatic extraction are sulfolane ($C_4H_8O_2S$), furfural ($C_5H_4O_2$), tetraethylene glycol ($C_8H_{18}O_5$), dimethylsulfoxide ($C_2H_6OS$), and N-methyl-2-pyrrolidone ($C_5H_9NO$). The mechanism is based on the high solubility of aromatic compounds in the solvent and relatively low solubility of the non-aromatic compounds in the mixture.

Aromatics are extracted from hydrocarbon streams to increase the value of the dearomatized stream and/or to recover the extracted aromatic compound(s) for sale as commodity product and use in a variety of processes. An objective of dearomatization is to purify a refinery stream to produce a better quality "raffinate". For example, kerosene, diesel and lube oils are dearomatized to increase their respective smoke point, cetane number and viscosity index. The separated aromatics from these streams do not have any particular application and are disposed of or used in the refinery as a by-product.

Dearomatization processes were first used in early 1900, for example, in the Edeleanu process described in U.S. Pat. No. 1,526,665 granted in 1907. The Edeleanu process extracts aromatics using liquid sulfur dioxide as a solvent. Other solvents, including phenol and furfural replaced sulfur dioxide in later years in aromatic extraction processes.

Aromatics are also extracted to obtain individual products as pure chemicals, i.e, commodity products. For example, benzene, toluene and xylene isomers (BTX) and ethylbenzene can be extracted from a light hydrocarbon stream, e.g., reformate, and then sold separately as commodity products. As is well-known, these aromatics cannot be obtained by conventional refinery distillation because the boiling point temperatures of the other components, i.e., naphthenes and paraffins, are too close to the boiling points of the aromatics.

Solvent extraction is a commonly used refinery separation technique. In recent years, additional solvents such as diethylene, tetraethyleneglycol, sulfolane, N-methylpyrrolidone, dimethylsulfoxide and N-formylmorpholine have been reported for use in processes to dearomatize the hydrocarbon streams.

Traditional solvents used in industrial aromatic extraction processes include glycols such as di-, tri- and tetra-ethyleneglycol, (DEG, TEG and TETRA respectively); amides such as N-methylpyrrolidone (NMP), N-formylmorpholine (NFM); and oxygenated derivatives of sulfur-bearing molecules such as dimethylsulfoxide (DMSO) or tetramethylenesulfone (sulfolane). These compounds have the general desired properties of industrial solvents, including thermal and chemical stability, low toxicity and corrosivity, ready availability and moderate cost. Table 1 lists common industrial extraction solvents with their properties and Table 2 provides the structural formula for these compounds.

TABLE 1

Industrial extraction solvents and their properties.

| Solvent | MW kg/kmol | $T_f$ °C. | $T_b$ @ 760 mmHg (300 mmHg) °C. | Density @ 20° C. kg/L | Viscosity @ ° C. mPa·s | Viscosity @ ° C. mPa·s |
|---|---|---|---|---|---|---|
| Diethyleneglycol (DEG) | 106.1 | −8.0 | 245 | 1.116 | 35.7 @ 20° C. | 0.97 @ 140° C. |
| Triethyleneglycol (TEG) | 150.2 | −7.0 | 288 | 1.123 | 49 @ 20° C. | 0.70 @ 140° C. |
| Tetraethyleneglycol (TETRA) | 194.2 | −4.0 | (300) | 1.125 | 61.9 @ 20° C. | 1.8 @ 150° C. |
| Sulfolane | 120.2 | 27.6 | 287 | 1.266 | 10.3 @ 30° C. | 2.5 @ 100° C. |
| N-methylpyrrolidone (NMP) | 99.1 | −24.4 | 202 | 1.027 | 1.65 @ 25° C. | 1.3 @ 30° C. |
| N-formylmorpholine (NFM) | 115.1 | 20.0 | 244 | 1.15 | 8.13 @ 20° C. | 8.13 @ 20° C. |
| Dimethylsulfoxide DMSO) | 78.1 | 18.5 | 189 | 1.08 | 1.99 @ 25° C. | 1.6 @ 35° C. |

TABLE 2

Industrial extraction solvents and their structures.

| Solvent | Structure |
|---|---|
| Diethyleneglycol | HO~~~O~~~OH |
| Triethyleneglycol | HO~~~O~~~O~~~OH |
| tetraethylene glycol | $H_3C\text{-}[O\text{-}]_4 OCH_3$ |
| Sulfolane | (sulfolane ring structure) |
| Furfural | (furfural structure) |
| N-methyl-2-pyrrolidone | (NMP structure) |

TABLE 2-continued

Industrial extraction solvents and their structures.

| Solvent | Structure |
| --- | --- |
| N-formylmorpholine |  |
| dimethylsulfoxide |  |

Sources of ODSO Compounds

As discussed above, it is well known in the art that the presence of mercaptans in petroleum products are undesirable because of their unpleasant odor and corrosivity and also because they degrade the stability of end-product fuels. Processes in oil refineries and natural gas processing plants that remove mercaptans and/or hydrogen sulfide ($H_2S$) are commonly referred to as sweetening processes because they produce products which no longer have the sour, foul odors of mercaptans and hydrogen sulfide. The liquid hydrocarbon disulfides can remain in the sweetened end products; or they can be used as part of the petroleum refinery or natural gas processing plant fuel; or they can be subjected to further downstream processing.

The MEROX designation is derived from the mercaptan oxidation step of the process. The MEROX process is a proprietary catalytic mercaptan oxidation process widely used in petroleum refineries and natural gas processing plants to remove mercaptans contained in end-products such as LPG, propane, butanes, light naphtha, kerosene and jet fuel by converting them into liquid hydrocarbon disulfides. It is an integrated process comprising the mercaptan extraction step in which mercaptans react with an aqueous caustic solution in the presence of a catalyst to form an alkylthiolate with a base, which is then oxidized in a wet air oxidation step to produce disulfide oils and a regenerated caustic solution that is recycled to the extraction step. The alkaline environment required in some versions of the practice of the MEROX process is provided by an aqueous solution of sodium hydroxide (NaOH), a strong base, or in other versions of the process, by ammonia, which is a relatively weaker base than sodium hydroxide, but also volatile and must be handled with special care due to its irritant and toxicity properties.

The stepwise reaction schemes for the MEROX process beginning with the treatment of the mercaptan are as follows:

$$2RSH+2NaOH \rightarrow 2NaSR+2H_2O \quad (1)$$

In the above reaction, RSH is a mercaptan and R is an organic group such as a methyl, ethyl, propyl or other hydrocarbon group. For example, the ethyl mercaptan (ethanethiol) has the formula $C_2H_5SH$.

The catalyst used in some versions of the MEROX process is a water-soluble liquid and in other versions the catalyst is impregnated onto charcoal granules. The catalyst used in the MEROX process can be an organometallic compound.

The second step is referred to as regeneration and it involves heating and oxidizing the caustic solution leaving the extractor. The oxidation results in converting the extracted mercaptans to organic disulfides (RSSR). These disulfides are water-insoluble liquids that are separated and decanted from the aqueous caustic solution. The regeneration reaction scheme is as follows:

$$4NaSR+O_2+2H_2O \rightarrow 2RSSR+4NaOH \quad (2)$$

In reactions (1) and (2), R is methyl or a hydrocarbon chain that may be straight, branched or cyclic. The R chains may be saturated or unsaturated. In most petroleum and diesel fractions, mixtures of mercaptans will occur such that the R groups in the disulfide oil (RSSR) can be the same or different groups.

The liquid disulfides created by the conversion of the mercaptans do not have these undesirable characteristics and have been retained in the MEROX treated fuels or removed and used elsewhere in the petroleum refinery. The MEROX process is generally more economical than a catalytic hydrodesulfurization process and achieves much the same result of the conversion of mercaptans. Economic and practical drawbacks associated with hydrodesulfurization processes include higher capital expenditures and operating costs.

SUMMARY OF THE INVENTION

In accordance with the present disclosure, it has been found that oxidized disulfide oil (ODSO) compounds are effective as solvents for extracting aromatics from hydrocarbon streams derived from fossil fuels.

By-product disulfide oil (DSO) compounds from the mercaptan oxidation process, commonly referred to as the "MEROX" process, when oxidized, preferably in the presence of a catalyst have been found to constitute an abundant source of ODSO compounds.

On a global basis, MEROX mercaptan oxidation units are commonly found in refineries and the disulfides generated are blended with fuel oil or processed in hydrotreating or hydrocracking process units or injected into the ground to dispose them. When the disulfides are added to fuel oil, they are typically burned to produce steam or provide other utilities. This use can raise environmental concerns where the combustion gases with sulfur-containing constituents are emitted in the refinery. The disulfides may undergo hydroprocessing, but hydroprocessing is not a favorable method for disposal of waste oil because additional hydrogen is required and consumed in the process.

Thus, the oxidation of the DSO to form ODSO compounds that are useful as a solvent for extracting aromatics from hydrocarbon streams converts an otherwise DSO waste oil product into a valuable commodity.

Table 3 includes examples of ODSO compounds produced in the oxidation of the DSO compounds derived from the MEROX sulfur reduction or sweetening process.

TABLE 3

| ODSO Compounds | | |
|---|---|---|
| ODSO Name | Formula | Exemplary Structures |
| Dialkyl-thiosulfoxide or alkyl-alkane-sulfinothioate | (R—SO—S—R) | 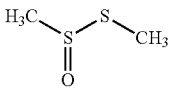 S-Methyl methanesulfinothioate |
| Dialkyl-thiosulfones or Alkyl-Alkane-thiosulfonate | (R—SOO—S—R) | 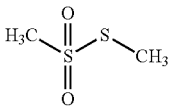 Methyl Methanethiosulfonate |
| Dialkyl-sulfonesulfoxide Or 1,2-alkyl-alkyl-disulfane 1,1,2-trioxide | (R—SOO—SO—R) | 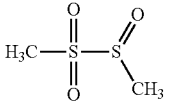 1,2-Dimethyldisulfane 1,1,2-trioxide |
| Dialkyl-disulfone Or 1,2 alkyl-alkyl-d sulfane 1,1,2,2-tetraoxide | (R—SOO—SOO—R) | 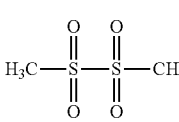 1,2-Dimethyldisulfane 1,1,2,2-tetraoxide |
| Dialkyl-disulfoxide | (R—SO—SO—R) | 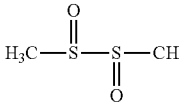 1,2-Dimethyldisulfane 1,2-dioxide |
| Alkyl-sulfoxidesulfonate | (R—SO—SOO—OH) | 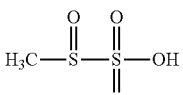 Methylsulfanesulfonic acid oxide |
| Alkyl-sulfonesulfonate | (R—SOO—SOO—OH) | 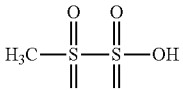 1-Hydroxy-2-methyldisulfane 1,1,2,2-tetraoxide |
| Alkyl-sulfoxidesulfinate | (R—SO—SO—OH) | 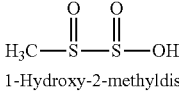 1-Hydroxy-2-methyldistilfane 1,2-dioxide |
| Alkyl-sulfonesulfinate | (R—SOO—SO—OH) | 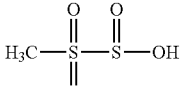 Methylsulfanesulfinic acid dioxide |

Table 3 includes ODSO compounds that are polar and water-soluble, and also those that are non-polar and water insoluble. ODSO compounds that contain 1 and 2 oxygen atoms are non-polar and water insoluble. ODSO compounds that contain 3 or more oxygen atoms are water-soluble. The production of either polar or non-polar ODSO compounds is in part dependent on the reaction conditions during the oxidation process.

The water soluble compounds that contain 3 or more oxygen atoms are water soluble over all concentrations and are also oil soluble at relatively low concentrations in the range of from 0.1 ppmw to 10 ppmw.

The oxidized disulfide oils from the MEROX process are highly effective as aromatic extraction solvents depending on the degree of oxidation, and water soluble ODSO compounds are effective as solvents for extracting aromatics from hydrocarbon streams.

The water soluble ODSO compounds have been found to be highly selective at removing benzene when compared to traditional solvents, i.e., non-ODSO aromatic extraction solvents, such as sulfolane.

It has also been found that both mono- and multi-ring aromatic compounds are removed. Di-aromatic hydrocarbons with a DBE=7 and tri-aromatic hydrocarbons with a DBE=10 are extracted by the ODSO solvent.

The disulfide oils having the general formula RSSR produced in the MEROX process can be oxidized without or with one or more catalysts to produce an oxidized disulfide oil (ODSO) for use as solvents in accordance with the present disclosure. If a catalyst is used in the oxidation of the disulfide oils (RSSR) to produce the oxidized disulfide oil (ODSO), it can be a heterogeneous or homogeneous oxidation catalyst. The oxidation catalyst can be selected from one or more heterogeneous or homogeneous catalyst comprising metals from the IUPAC Group 4-12 of the Periodic Table, including Ti, V, Mn, Co, Fe, Cr, Cu, Zn, W and Mo. In certain embodiments, suitable homogeneous catalysts include molybdenum naphthanate, sodium tungstate, molybdenum hexacarbonyl, tungsten hexacarbonyl, sodium tungstate and vanadium pentoxide. In certain embodiments, suitable heterogeneous catalysts include Ti, V, Mn, Co, Fe, Cr, W, Mo, and combinations thereof deposited on a support such as alumina, silica-alumina, silica, titania, natural zeolites, synthetic zeolites, and combinations comprising one or more of the above supports. A preferred catalyst is sodium tungstate, $Na_2WO_4.2H_2O$. This catalyst is commercially available, e.g., from Sigma-Alrich Co. LLC.

The catalytically oxidized disulfide oil can be blended with other traditional solvents such as diethyleneglycol, triethyleneglycol, tetraethylene glycol, sulfolane, furfural, N-methyl-2-pyrrolidone, N-formylmorpholine, dimethylsulfoxide, or a combination thereof.

In preferred embodiments, the blend includes one or more of the traditional solvents in the range of from 0.1 W % to 99.9 W %, 1.0 W %-50 W %, 1.0 W %-30 W %, 0.1 W %-50 W %, 0.1 W %-30 W %, or 1.0 W %-99.9 W %. Traditional solvents can be blended to change the selectivity of the aromatic solvent, even at very low concentrations, i.e., from 0.1 to 5.0 W % of traditional solvent. Traditional solvents can also be blended when the availability of ODSO is limited.

As used herein "aromatic extraction solvent" is used to describe one or a mixture of two or more of the individual water soluble OSDO compounds or a mixture of one or more water soluble ODSO compounds blended with one or more of the traditional industrial aromatic solvents identified above.

Individual ODSO compounds can be separated from the bulk ODSO mixture produced from the MEROX process based on the individual ODSO physical and chemical properties. This permits the use of individual ODSO compounds in the aromatic extraction solvent that may offer unique properties not found in a bulk mixture of an aromatic extraction solvent.

The aromatic extraction solvent of the present disclosure is highly effective as a solvent for extracting aromatics from hydrocarbon streams derived from fossil fuels and preferred feedstocks can include naphtha boiling in the range of from 36° C. to 180° C., gas oil boiling in the range of from 180 to 370° C. and vacuum gas oil boiling in the range of from 370° C. to 650° C. The source of the feed can include crude oils, coal liquids, cellulose-based bio liquids and intermediary refinery streams from hydrotreaters, hydrocracking units, delayed cokers, catalytic reformers, fluid catalytic cracking units, thermal cracking units, and the like.

The aromatic extraction solvent is useful in extracting mono-aromatics, such as benzene, toluene and xylene (BTX) as well as poly-aromatics from a hydrocarbon stream.

The oxidation of DSO to produce the OSDO can be carried out in an oxidation reaction vessel operating at a pressure in the range from about 1 bar to about 30 bars, in certain embodiments from about 1 bar to about 10 bars, and in further embodiments from about 1 bar to about 3 bars, and at a temperature of about 20° C. to 300° C., and in certain embodiments about 20° C. to 150° C. and in further embodiments about 45° C. to 60° C. The molar feed ratio of oxidizing agent-to-mono-sulfur can be in the range of from about 1:1 to about 100:1, and in certain embodiments from about 1:1 to about 30:1, and in further embodiments from about 1:1 to about 4:1. The residence time in the reaction vessel can be in the range of from about 5 to 180 minutes, in certain embodiments from about 15 to 90 minutes, and in further embodiments from about 15 minutes to 30 minutes.

BRIEF DESCRIPTION OF THE DRAWINGS

The process of the disclosure will be described in more detail below and with reference to the attached drawings in which.

DETAILED DESCRIPTION OF THE INVENTION

Figure 1:
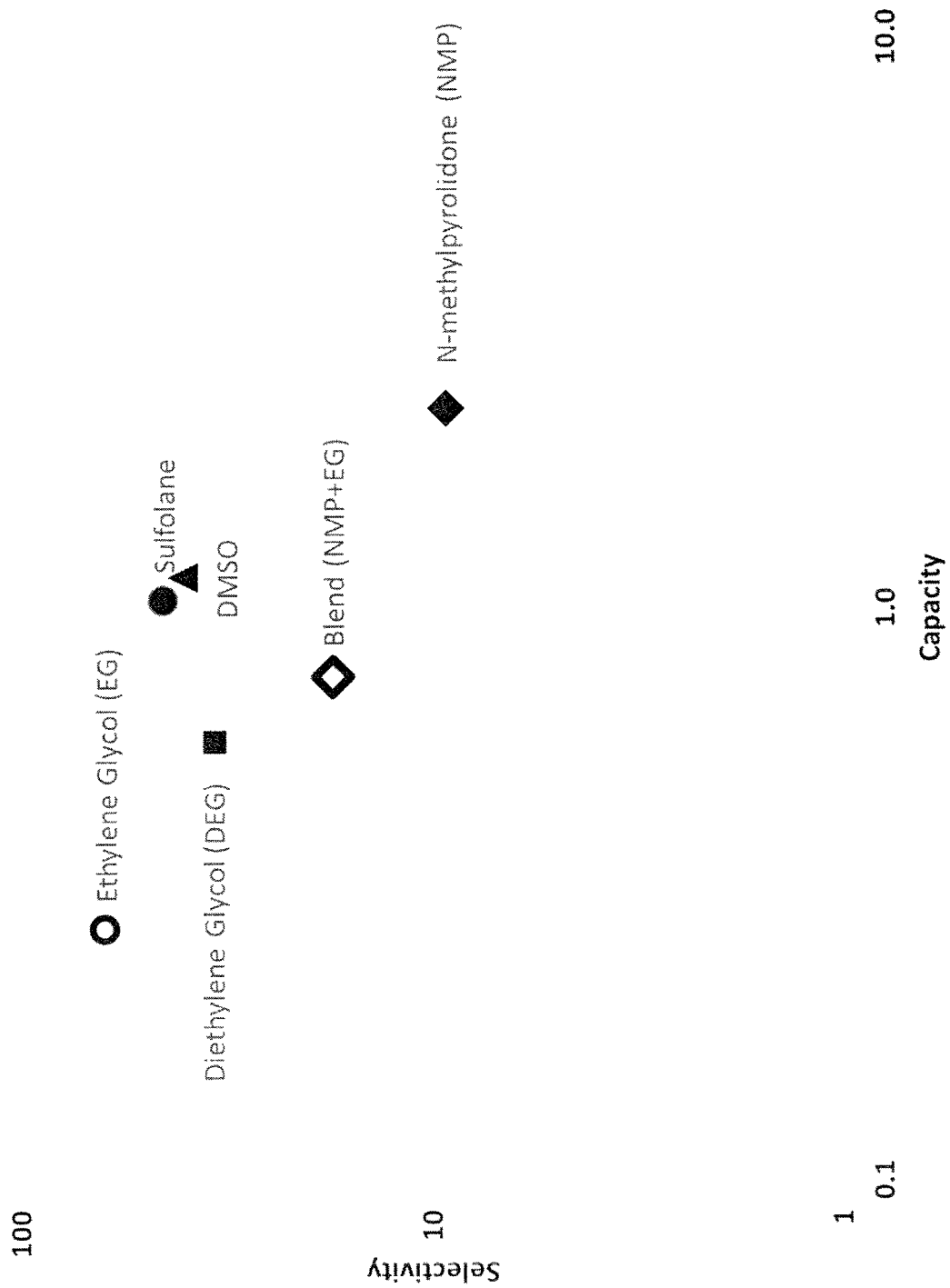
FIG. 1 is a graph illustrating the selectivity and capacity of the selected traditional industrial solvents for dearomatization from the prior art that are useful for blending with one or more ODSO compounds to provide a solvent, data points reproduced from Wauquier, Jean Pierre, *Petroleum Refining*, Vol. 2, *Separation Processes*, editions TECHNIP, page 430.

Aromatic compounds are selectively extracted from a hydrocarbon feed using an aromatic extraction solvent derived from a disulfide oil. In general, any feed containing aromatics is a suitable feed. Preferred feedstocks include naphtha boiling in the range of from 36° C. to 180° C., gas oil boiling in the range of from 180 to 370° C. and vacuum gas oil boiling in the range of from 370° C. to 650° C. The source of the feed can include crude oils, coal liquids, cellulose-based bio liquids and intermediate refinery streams from hydrotreaters, hydrocracking units, delayed cokers, catalytic reformers, fluid catalytic cracking thermal cracking units, fluid catalytic cracking units, etc.

In embodiments where the targeted aromatic compound is benzene, a preferred aromatic extraction solvent is one or a mixture of neat ODSO compounds, i.e., used alone. In embodiments where one or more ODSO compounds are blended with traditional aromatic solvents, any aromatic-containing feed can be treated.

In a preferred embodiment, the number of carbon atoms in the ODSO aromatic extraction solvent is in the range of from 1 to 20.

The ODSO aromatic extraction solvent has a boiling temperature higher than that of benzene (80° C.) which is the least volatile of the aromatics to be extracted. In some embodiments, the ODSO aromatic extraction solvent has a boiling point at least 10° C. or at least 20° C. higher than the extract. Preferred boiling temperatures for the aromatic extraction solvent are in the range of from 80° C. to 140° C., 90° C. to 140° C., or 100° C. to 140° C. The solvent can thereafter be regenerated from the extracted aromatic mixture by a simple and, consequently, economical distillation process.

The water soluble ODSO aromatic extraction solvent has a specific gravity close to or greater than 1.38, thereby ensuring a gravity differential with the hydrocarbons in the feed. Typically, the hydrocarbons in the feed have a density at 20° C. that is between 0.660 and 0.880 g/cm$^3$ which promotes rapid phase settling of the denser solvent and solute and efficient operation of the liquid/liquid separation vessel.

In preferred embodiments, the aromatic extraction solvent has a density greater or equal to 1.0 g/cc. In certain embodiments, the aromatic extraction solvent has a density in the range of from 1.1 g/cc to 1.7 g/cc.

In general, ODSO aromatic extraction solvents that include mainly water insoluble ODSO compounds will have a lower density than aromatic extraction solvents that include mainly water soluble ODSO compounds.

It may be possible to isolate individual groups, or more narrow cuts, of ODSO compounds from a mixture of ODSO compounds based on their individual densities and temperatures for inclusion in the aromatic extraction solvent.

The aromatic extraction solvent has a sufficiently low crystallization temperature so that aromatic extraction can occur without complex equipment and controlled systems. In contrast, traditional industrial solvents such as sulfolane, DMSO and NFM have relatively high crystallization temperatures which may require steam tracing on steam-heated storage tanks and lines depending upon the operating conditions, unit design, and the feedstocks.

The ODSO aromatic extraction solvent has a high viscosity at ordinary temperatures especially for mixtures with glycols, but has a viscosity always lower than 2.5 mPa·s at the operating temperature in the extractor. This allows for favorable rapid mass transfer kinetics.

The presence of water will decrease extraction capacity, but improves selectivity for the one or more targeted aromatics. Therefore, for aromatic extraction solvents including ODSO compounds without the addition of traditional solvents, when the ODSO already possesses enhanced selectivity, lower water concentrations are preferred in order to avoid negatively effecting the capacity of the overall aromatic extraction solvent.

In preferred embodiments, the aromatic extraction solvent comprises water in the range of from 0.1 W %-50 W % of the solvent. In preferred embodiments, the aromatic extraction solvent comprises water in the range of from 1.0 W %-50 W % of the solvent, or 1.0 W %-30 W % of the solvent.

For blended solvents, i.e., solvents where one or more ODSO compounds are blended with one or more traditional solvents, the preferred water content will depend of the properties of the traditional solvent.

In a preferred embodiment, the aromatic extraction solvent is a mixture of ODSO compounds, each compound having a distinct boiling point which can vary over a significant temperature range. The boiling point of the individual ODSO compounds in the mixture depends on the degree of oxidation in the di-sulfide moiety. It is therefore possible to have selective aromatic extraction for different aromatic components of the hydrocarbon feed.

In preferred embodiments, the aromatic extraction process is conducted under ambient conditions. In other embodiments, the aromatic extraction process is conducted at temperatures above ambient.

In certain embodiments, a hydrocarbon feed is contacted with one or a mixture of neat water soluble ODSO compounds to remove some or all of benzene in the feed. The benzene-lean stream is then contacted with a traditional industrial solvent to remove other aromatic compounds. In this embodiment, two aromatic streams are produced: (1) a benzene-rich stream and (2) and an aromatic-rich stream.

In certain embodiments, a hydrocarbon feed is contacted with one or a mixture of water soluble ODSO compounds to produce a hydrocarbon stream of reduced aromatic content. The hydrocarbon stream of reduced aromatic content can then be contacted with a non-ODSO aromatic extraction solvent to further reduce the aromatic content. In certain embodiments, the resulting hydrocarbon stream is essentially aromatic free.

Extraction Capacity and Selectivity

The aromatic extraction solvents for use in aromatic extraction processes have a molecular structure made up of a radical moiety or a relatively small hydrocarbon ring, and a polar group. These structural properties allow the aromatic extraction solvent to be miscible with each other and with water and also provide the desired selectivity for aromatic hydrocarbons.

In a given hydrocarbon, the aromatic extraction solvent's solubility depends on the chemical nature of the hydrocarbon and to a lesser degree, its molecular size. Specifically, when considering the different chemical families of hydrocarbons, there is a decreasing solubility in the order for components with the same number of carbon atoms as follows: aromatics>diolefins>olefins>naphthenes>paraffins. In the same chemical family, solubility decreases moderately with an increase in the molecular weight of the hydrocarbon.

For example, it has been found that benzene, MW=78.11 g/mol, has a higher solubility than toluene, MW=92.14 g/mol in an ODSO aromatic solvent that comprises all water soluble ODSO compounds produced in the oxidation reaction described herein.

Capacity is defined as a distribution coefficient which is the ratio of the concentration of aromatics in the solvent phase to the concentration of aromatics in the raffinate phase.

Selectivity is defined as the ratio of the distribution coefficient for aromatics divided by the distribution coefficient for non-aromatics.

Capacity increases as the solvent dissolves more aromatics, and selectivity increases as the ability of the solvent to reject aliphatics increases.

The selectivity and capacity of the commonly used solvents of the prior art are illustrated in FIG. 1. Solvent capacity or solvent power is expressed by the distribution coefficient of benzene at the origin in volume fractions. Solvent selectivity is expressed as the ratio of the distribution coefficients of benzene and hexane. The data points on the graph in FIG. 1 show a clear tendency to follow a law of inverse variation between selectivity and capacity. Two solvents, dimethylsulfoxide and sulfolane, appear from this graph to be good candidates for use in the present process, in view of the similar selectivity and capacity of these two solvents. The properties of a blended mixture is expected to have capacity and selectivity values between the values of the two individual components.

The addition of water to the mixture and a change in the temperature at which the extraction is conducted will both change the extraction performance. Adding water to a solvent decreases its capacity and increases its selectivity. In contrast, raising the extraction temperature improves solvent capacity at the expense of reducing its selectivity.

Example 1

A sample of gas oil derived from Arabian medium crude oil containing aromatics was used as a feedstock for extraction of the aromatics using an oxidized disulfide oil (ODSO). The number of carbon atoms in the individual water soluble OSDO compounds of the solvent used in Example 1 is in the range of from 2 to 4 carbon atoms. The properties and composition of the gas oil are shown in Table 4.

TABLE 4

Composition of Gas Oil in Example 1

| Parameter | Unit | Value |
| --- | --- | --- |
| Density | g/cm3 | 0.842 |
| Refractive index@ 20°C. | — | 1.47 |
| Hydrogen | W % | 13.21 |
| Carbon | W % | 85.27 |
| Sulfur | Ppmw | 13,090 |
| Nitrogen | Ppmw | 71 |
| Cetane Number | — | 59.5 |
| Paraffins | W % | 44.5 |
| Naphthenes | W % | 23.4 |
| Aromatics | W % | 32.1 |
| Distillation (ASTM 2887) | | |
| 0 W% | ° C. | 141 |
| 10 W% | ° C. | 204 |
| 30 W% | ° C. | 249 |
| 50 W% | ° C. | 285 |
| 70 W% | ° C. | 319 |
| 90 W% | ° C. | 351 |
| 100 W% | ° C. | 400 |

Figure 2:
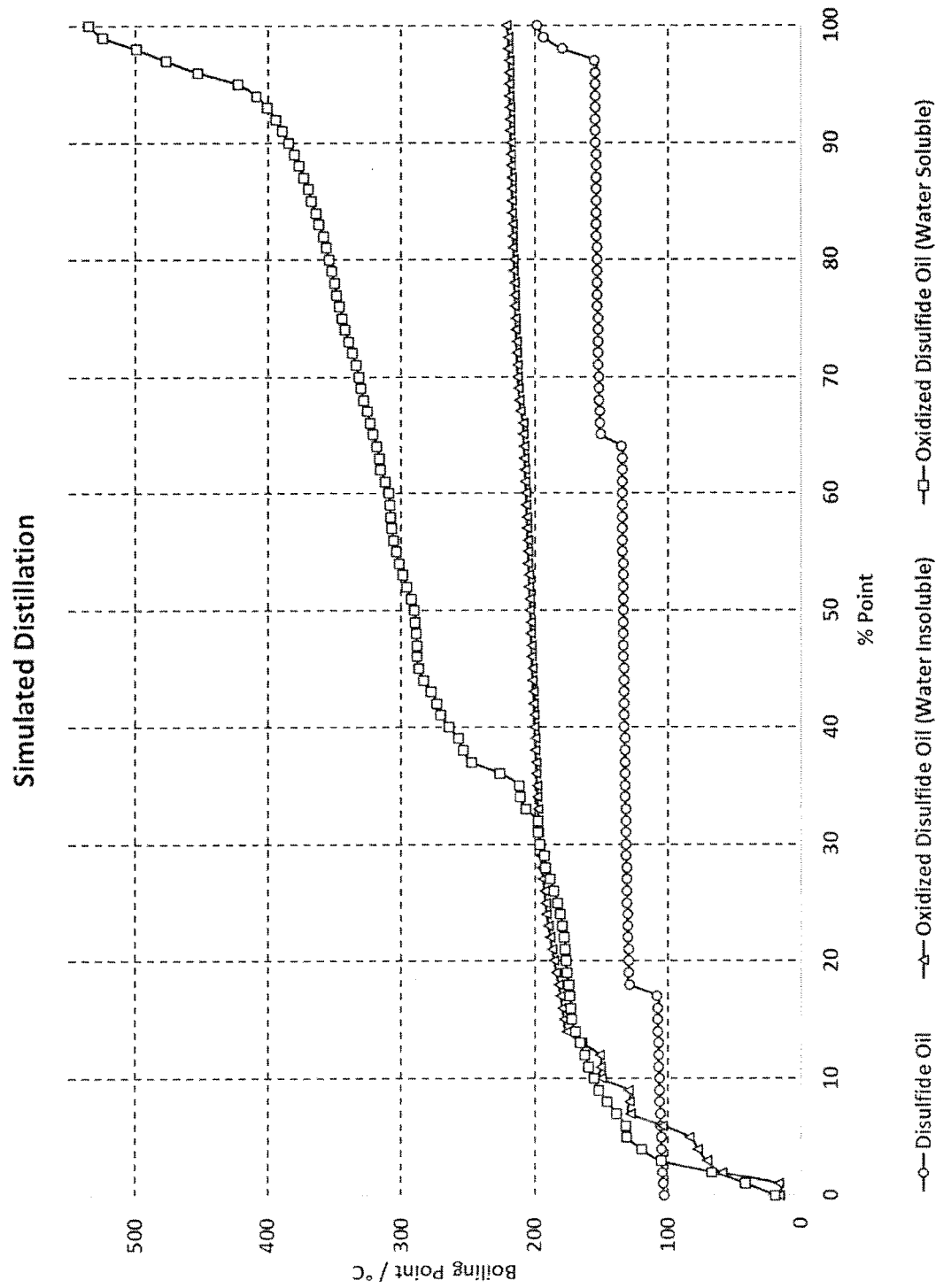
FIG. 2 is a graph illustrating the simulated distillation data of various oxidized oil fractions.

Simulated distillation of the oxidized oil at various stages of oxidation is shown in FIG. 2. It is clear that a significant difference, i.e., about 156° C., is shown between the mid-boiling points of the original disulfide oil and the oxidized water soluble oil. The water soluble oil shows an increase in mid-boiling points.

The increased boiling points of the water soluble ODSO imply a reduced vapor pressure of the components. This in turn reduces issues relating to the sour/foul smell of the disulfide derivative compounds.

The increase in boiling points reflect heavier compounds being formed as a function of increased oxidation. The increased oxidation results in phase transfer from the water-insoluble phase to the water-soluble phase.

Water soluble ODSO compounds are immiscible with aromatic-containing streams, e.g., gas oil, and after intense mixing is discontinued, two separate layers are formed from the mixture which results in easier separation of the aromatic-containing ODSO solvent and the raffinate phase.

Density of the water soluble ODSO solvent is also higher when compared to the water insoluble ODSO solvent. This is advantageous in counter-current mixing processes.

Example 2

The aromatic extraction process was carried out on gas oil at 20° C. and atmospheric pressure. The gas oil and water soluble ODSO were mixed in equal volume and vigorously shaken for 10 minutes. The number of carbon atoms in the individual water soluble OSDO compounds of the solvent used in Example 2 is in the range of from 2 to 4 carbon atoms. There were two distinct phases at the start and end of the reaction.

Visual observations show that the bottom phase, which includes the ODSO and solute, changed from colorless/white to a dense black, indicating that some aromatic extraction occurred. The feedstock and the extract phase were analyzed using FT-ICR MS, with the results shown in Table 5 as a function of Double Bond Equivalence (DBE).

TABLE 5

FT-ICR MS results showing the percent of aromatics as a function of DBE

| DBE | Gas Oil, % | Aromatic Extract, % |
| --- | --- | --- |
| 4 | 0.2 | 5.0 |
| 5 | 0.2 | 3.9 |
| 6 | 1.4 | 3.7 |
| 7 | 14.2 | 32.8 |
| 8 | 48.8 | 34.7 |
| 9 | 23.9 | 11.0 |
| 10 | 9.3 | 6.5 |
| 11 | 1.2 | 1.6 |
| 12 | 0.7 | 0.7 |
| 13 | 0.0 | 0.1 |
| 14 | 0.1 | 0.00 |
| Total | 100.00 | 100.0 |

Referring to Table 5, the results of the FT-ICR MS analysis report the percent of aromatics is shown as a function of DBE. The "Aromatic Extract, %" column is the DBE number ratio of the gas oil-extracted ODSO fraction from the total accumulated DBE number intensity of that particular sample.

The concentrations shown are based on the peak intensities obtained in the FT-ICR MS analysis and are relative to each other.

As also shown by the data in Table 5, the water soluble ODSO mixture extracted aromatics from the gas oil phase is indicated by change in the amount of a particular DBE from the original gas oil ("Gas Oil, %") and the gas oil-extracted ODSO ("Aromatic Extract, %"), and indicates that the gas oil components are in the ODSO solvent layer.

During aromatic extraction of the gas oil, a portion of the gas oil is extracted into the ODSO. For the extract layer comprising the ODSO solvent with a portion of the aromatics derived from the gas oil for DBE values across the range of 4-14, FT-ICR MS (not shown) has detected compounds having carbon numbers above 4, with a minimum carbon number of 10 and a maximum carbon number of 26. Since the disclosed ODSO molecules used in Example 2 have a DBE value of 0 and have a maximum of four (4) carbon atoms in their structures, it is clear that the hydrocarbon components in the water soluble ODSO solvent must derive from the gas oil and hence extraction of aromatics has occurred.

The data of Table 5 clearly demonstrates that the ODSO solvent is a powerful extraction solvent for the aromatics in the gas oil sample of Example 1.

Example 3

An n-dodecane stock solution spiked with BTX was used as a feedstock for the extraction of the aromatics using separately a water soluble oxidized disulfide oil (ODSO) solvent and a sulfolane solvent. The number of carbon atoms in the individual water soluble OSDO compounds of the ODSO solvent used in Example 3 is in the range of from 2 to 4 carbon atoms. The feedstock contained approximately 5 wt. % of benzene, 5 wt. % of toluene, 5 wt. % of o-xylene, 5 wt. % of m-xylene and 5 wt. % of p-xylene, as indicated in Table 6.

TABLE 6

GS-MS results showing selectivity of the ODSO compounds vs. sulfolane

| | Sulfolane Extraction (wt. %) | | | ODSO Extraction (wt. %) | | |
|---|---|---|---|---|---|---|
| | Stock | Extract | Normalized Selectivity | Stock | Extract | Normalized Selectivity |
| Benzene | 4.12 | 0.69 | 100 | 4.49 | 0.26 | 100 |
| Toluene | 4.4 | 0.37 | 50 | 4.95 | 0.02 | 7 |
| m-Xylene | 4.81 | 0.58 | 72 | 5.08 | 0 | 0 |
| p-Xylene | 4.67 | 0.21 | 27 | 4.95 | 0 | 0 |
| o-Xylene | 4.66 | 0.09 | 12 | 4.93 | 0.06 | 21 |

The feedstock and solvent were vigorously shaken for 10 minutes at room temperature and atmospheric pressure.

After mixing, two distinct phases separated and were isolated. The raffinate layer comprised the feedstock with a portion of its aromatics removed. The extract layer comprised the solvent with the portion of aromatics removed from the feedstock.

Table 6 includes the results of a GC-MS analysis showing the wt. % of the BTX in the extract layer. When the selectivity is normalized, it is clear that the sulfolane solvent extracts all BTX components with no significant distinction between the different types of aromatics. In contrast, it is also clear from the results in Table 6 that the water soluble ODSO solvent has excellent selectivity for one specific aromatic, i.e., benzene.

It is clear from Table 6 that in embodiments where the targeted aromatic compound is benzene, a preferred aromatic extraction solvent is one or a mixture of ODSO compounds used alone, i.e., without other types of solvents.

The methods and compositions of the present invention have been described in detail above and in the attached drawings; however, modifications will be apparent to those of ordinary skill in the art from this description and the scope of protection for the invention is to be determined by the claims that follow.

We claim:

1. A process for the separation of aromatic hydrocarbon compounds from a mixture of hydrocarbons, the process comprising:

a. contacting the mixture containing both aromatic and non-aromatic hydrocarbon compounds with an ODSO aromatic extraction solvent one or more of the following compounds:
1,2 alkyl-alkyl-disulfane 1,1,2 trioxide (R-SOO-SO-R),
1,2 alkyl-alkyl-disulfane 1,1,2,2 tetraoxide (R-SOO-SOO-R),
alkyl-sulfoxidesulfonate (R-SO-SOO-OH),
alkyl-sulfonesulfonate (R-SOO-SOO-OH),
alkyl-sulfoxidesulfinate (R-SO-SO-OH), and
alkyl-sulfonesulfiante (R-SOO-SO-OH) to form an extract containing the solvent and dissolved aromatics, and a raffinate comprising non-aromatic hydrocarbon compounds;
b. separating the extract from the raffinate; and
c. recovering a hydrocarbon stream of reduced aromatic content and an extract stream.

2. A process for the separation of one or more targeted aromatic hydrocarbon compounds from a hydrocarbon mixture containing targeted and non-targeted aromatic compounds, and non-aromatic hydrocarbons, the process comprising:

a. contacting the mixture containing both aromatic and non-aromatic hydrocarbon compounds with an ODSO aromatic extraction solvent comprising a mixture of one or more. of the following ODSO compounds:
1,2 alkyl-alkyl-disulfane 1,1,2 trioxide (R-SOO-SO-R),
1,2 alkyl-alkyl-disulfane 1,1,2,2 tetraoxide (R-SOO-SOO-R),
alkyl-sulfoxidesulfonate (R-SO-SOO-OH),
alkyl-sulfonesulfonate (R-SOO-SOO-OH),
alkyl-sulfoxidesulfinate (R-SO-SO-OH), and
alkyl-sulfonesulfiante (R-SOO-SO-OH) to firm an extract comprising the solvent: and dissolved targeted aromatic compounds, and a raffinate comprising non-aromatic hydrocarbon compounds and non-targeted aromatics;
b. separating the extract from the, raffinate; and
c. recovering a hydrocarbon stream of reduced targeted aromatic content and the extract stream.

3. The process of claim 1, wherein the oxidized disulfide oil compounds are derived from a MEROX process.

4. The process of claim 1, wherein the one or more oxidized disulfide oil compounds comprising the solvent are selected to remove mono- and multi-aromatic compounds from the hydrocarbon stream.

5. The process of claim 1, wherein the hydrocarbon stream of reduced aromatic content is contacted with a non-oxidized disulfide oil aromatic extraction solvent to further reduce the aromatic content.

6. The process of claim 2, wherein the one or more ODSO compounds comprising the solvent are selected to remove the one or more targeted aromatic compounds from the hydrocarbon stream.

7. The process of claim 6, wherein benzene is a targeted aromatic compound.

8. The process of claim 2, wherein the hydrocarbon stream of reduced targeted aromatic content is contacted with a second ODSO aromatic extraction solvent to reduce the non-targeted aromatic content of the hydrocarbon stream and produce a hydrocarbon stream of reduced aromatic content.

* * * * *